No. 787,484.

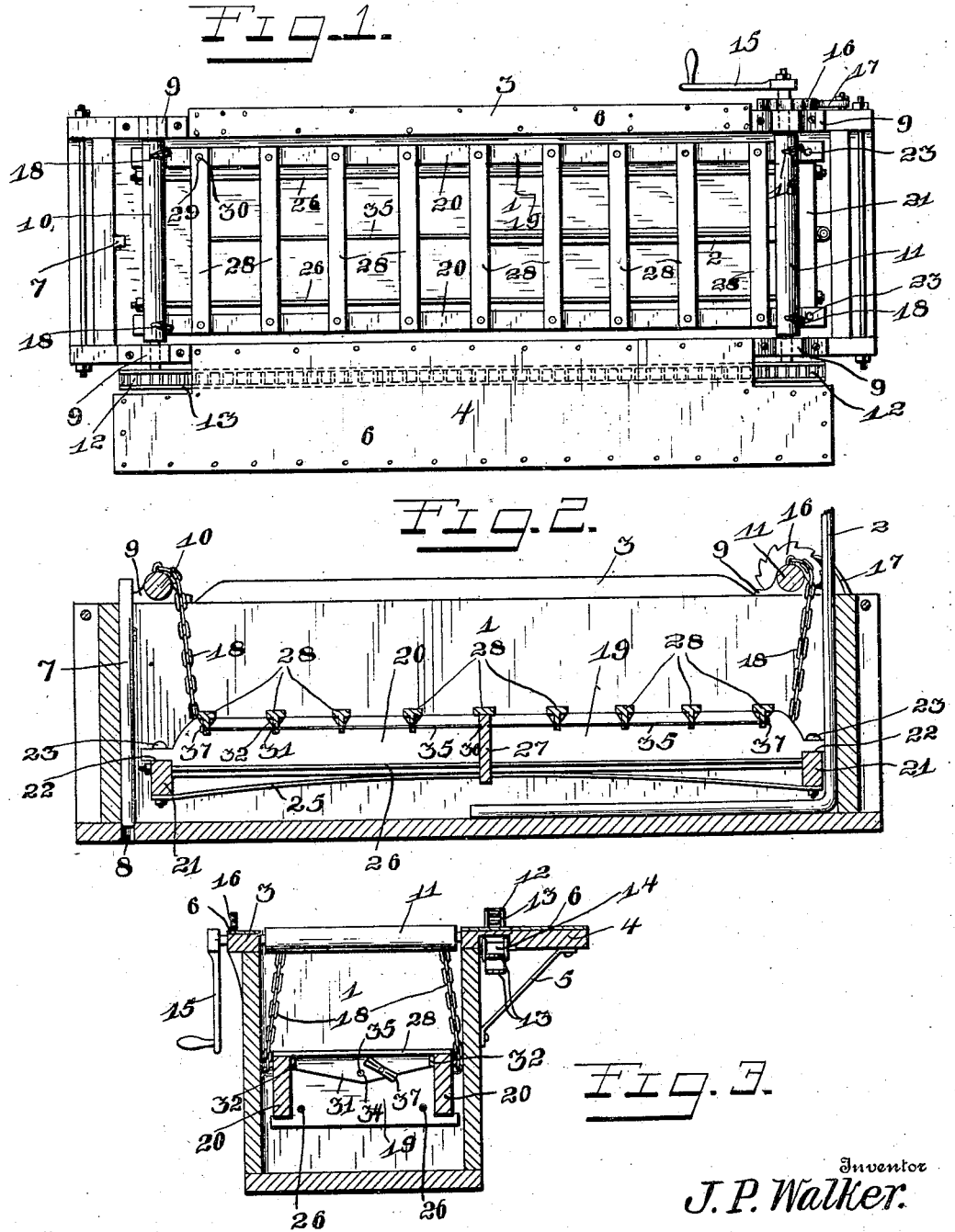

Patented April 18, 1905.

UNITED STATES PATENT OFFICE.

JACOB P. WALKER, OF HAVRE DE GRACE, MARYLAND.

TOMATO-SCALDER.

SPECIFICATION forming part of Letters Patent No. 787,484, dated April 18, 1905.

Application filed May 31, 1904. Serial No. 210,598.

*To all whom it may concern:*

Be it known that I, JACOB P. WALKER, a citizen of the United States, residing at Havre de Grace, in the county of Harford and State of Maryland, have invented certain new and useful Improvements in Tomato-Scalders; and I do declare the following to be a full, clear, and exact description of the invention, such as will enable others skilled in the art to which it appertains to make and use the same.

My invention is an improved device for scalding tomatoes and other vegetables and fruits by lowering the same in a tank of hot water and raising the same therefrom, to loosen the skins thereof and facilitate the peeling of the fruits and vegetables; and my invention consists in the construction, combination, and arrangement of devices hereinafter described and claimed.

In the accompanying drawings, Figure 1 is a plan view of a scalding-machine embodying my improvements. Fig. 2 is a longitudinal section of the same, and Fig. 3 is a transverse section of the same.

The tank 1, which contains the hot water, may be of any suitable size and shape. A steam-pipe 2 is here shown which extends downwardly into the tank at one end thereof and along the bottom of the tank, its function being to keep the water in the tank at the required temperature. On one side of the tank is a ledge 3. On the opposite side thereof is an outwardly-extending shelf 4, brackets 5 being provided to support said shelf. The latter and the ledge 3 are covered on their upper sides with suitable sheet metal, as at 6. At the end of the tank opposite the steam-pipe 2 is a vertically-movable plug-valve 7 for closing or opening the opening 9 in the bottom of the tank for discharging the hot water therefrom. On the sides of the tank at the ends thereof are bearings 9, in which are journaled a pair of shafts 10 and 11, each of which is provided at one end with a sprocket-wheel 12. The said sprocket-wheels are connected together by an endless sprocket-chain 13, which extends under the shelf 4, its upper lead passing under direction-rollers 14, which are mounted in the shelf near the ends thereof. It will be understood that the sprocket-wheels and chain cause the shafts to revolve simultaneously in the same direction. The shaft 10 has a crank 15 at one end, whereby it may be rotated, and is further provided with a ratchet-wheel 16, engaged by a gravity-pawl 17, the latter being pivotally connected to one side of the tank. The shafts form winches, and to the same are connected the upper ends of chains 18, which are adapted to be wound thereon and unwound therefrom, according to the direction in which the shafts are turned.

In the tank is a vertically-movable frame 19, which has its ends attached to the lower ends of the said chains, whereby the said frame may be raised and lowered by appropriately turning the winch-shafts. The sides 20 of the said frame have their ends connected together by cross-bars 21, the upper sides of which are placed in rabbets 22 in the lower corners of the sides 20 and are secured to the latter by bolts 23. On the under edges or sides of the side pieces 20 are strap-irons 25, which have their intermediate portions secured thereto and their end portions bent down from the sides 20 and secured to the cross-bars 21 by the bolts 23. The cross-bars 21 are connected together by longitudinally-disposed bolt-rods 26, as shown. A cross-bar 27 is disposed between the sides 20 at the centers thereof and projects below their lower edges, its upper side being flush with their upper edges. The upper sides of the side pieces 20 of the frame are connected together by a series of cross-bars 28, which are provided at their ends with openings 29 to receive dowel-pins 30, which project from the upper sides of the side pieces 20. Each of said cross-bars 28 is formed with a depending flange 31, having shoulders 32 at its ends to bear against the inner surfaces of the side pieces 20 and provided at its center with an opening 34. The openings 34 of the respective cross-bars 28 aline with one another, and the said cross-bars at each end of the frame are connected together by a longitudinally-movable rod 35, which passes through the said alined openings, and the inner end of which is adapted to engage an opening 36 in one side of the cross-bar 27. One of the cross-bars 28 near each end of the frame is provided with a pivoted lock-button 37, mounted on its depending flange, the said lock-button being adapted to engage the rod to lock the latter when the same is in engagement with the opening 36. It will be understood that these lock-rods connect the cross-bars together, and that when the said lock-rods are released from the openings 36 the cross-bars 28 may be readily removed from the frame to enable them to be cleansed and to permit access to the interior of the tank and of the frame, so that the tank and frame may be readily cleansed when the same becomes necessary.

In the operation of my improved scalding device the frame is raised above the level of the hot water in the tank, and an operator on one side of the tank places wire trays or other suitable receptacles containing the tomatoes or other vegetables or fruits to be scalded on the cross-bars of the frame and by appropriately turning the crank lowers the frame into the tank so as to lower the vetegables or fruits into the hot water. The same are kept in the hot water a suitable length of time, and the crank is then reversely turned to elevate the frame and raise the trays containing the vegetables or fruits from the water, the said trays being removed from the frame by another operator stationed on the opposite side of the tank, the shelf 4 facilitating the removal of the trays and serving to support them while being drained.

Having thus described my invention, what I claim, and desire to secure by Letters Patent, is—

1. In scalding apparatus of the class described, a raising and lowering frame having side pieces and a cross-piece and dowel-pins projecting upwardly from the side pieces, cross-bars to rest on the side pieces and having openings to receive the dowel-pins, means to connect a plurality of the said cross-bars together and to release them at will, winch-shafts at the ends of the tank, chains connecting the frame to the winches, and drive-chains connecting the winch-shafts for simultaneous revolution in the same direction, substantially as described.

2. In apparatus of the class described, a raising and lowering frame having side pieces and a cross-piece, the latter having lock-notches and the frame having upwardly-projecting dowel-pins, cross-bars to rest on the side pieces and having openings to receive the dowel-pins and further provided with alined openings, longitudinally-movable locking-rods in said alined openings to engage the lock-notches in the cross-piece, and means to lock said locking-rods, substantially as described.

In testimony whereof I have hereunto set my hand in presence of two subscribing witnesses.

JACOB P. WALKER.

Witnesses:
H. C. FOSTER,
M. E. FOSTER.